July 3, 1934.  H. KOCH  1,965,194
COMBINATION VELOCIPEDE
Filed May 22, 1933  2 Sheets-Sheet 1
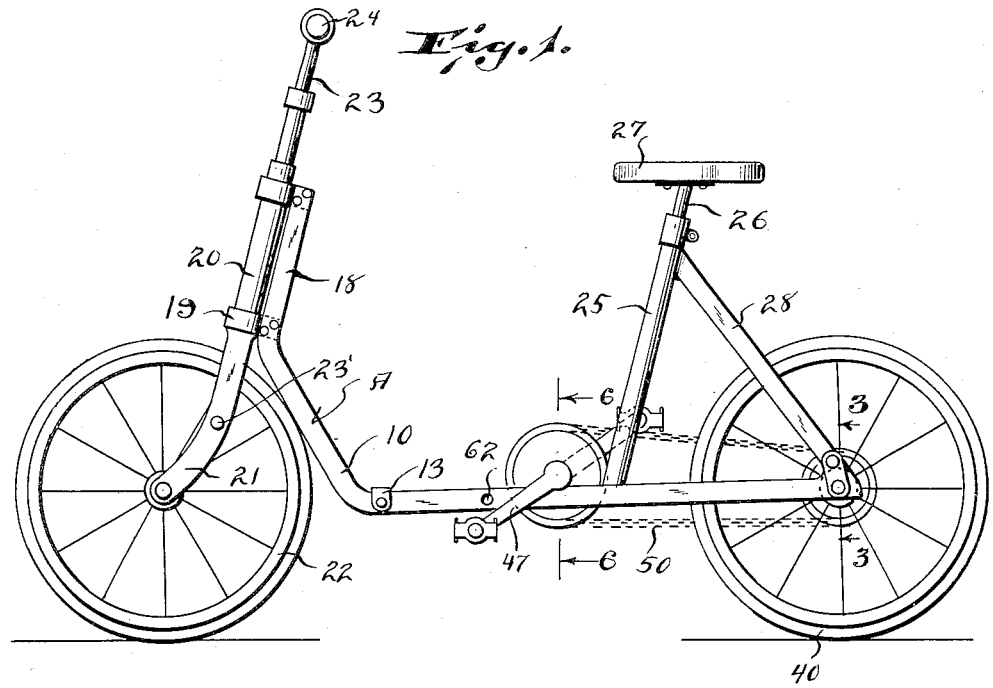
Fig. 1.
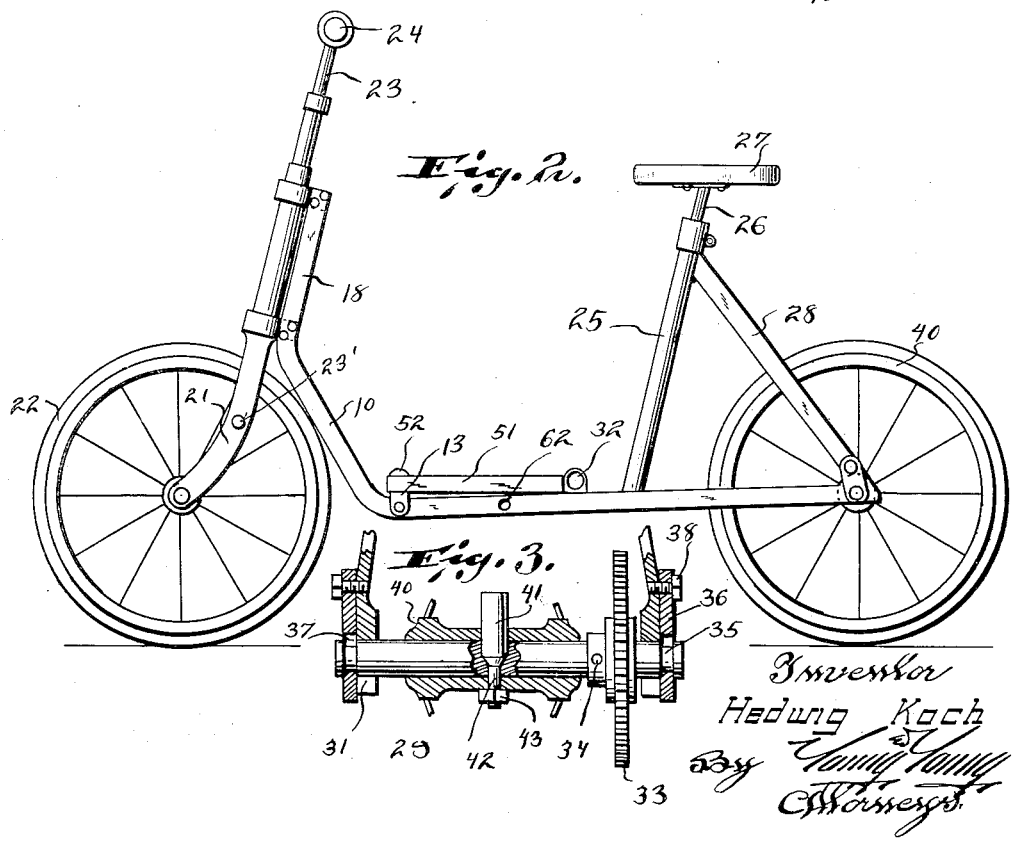
Fig. 2.
Fig. 3.
Inventor
Hedwig Koch July 3, 1934.  H. KOCH  1,965,194
COMBINATION VELOCIPEDE
Filed May 22, 1933   2 Sheets-Sheet 2
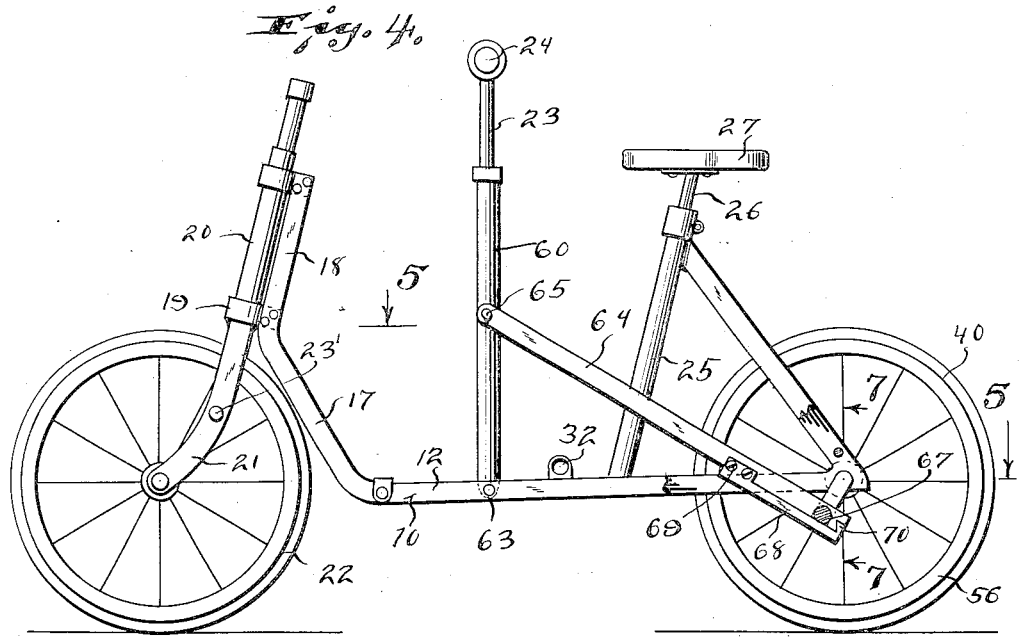
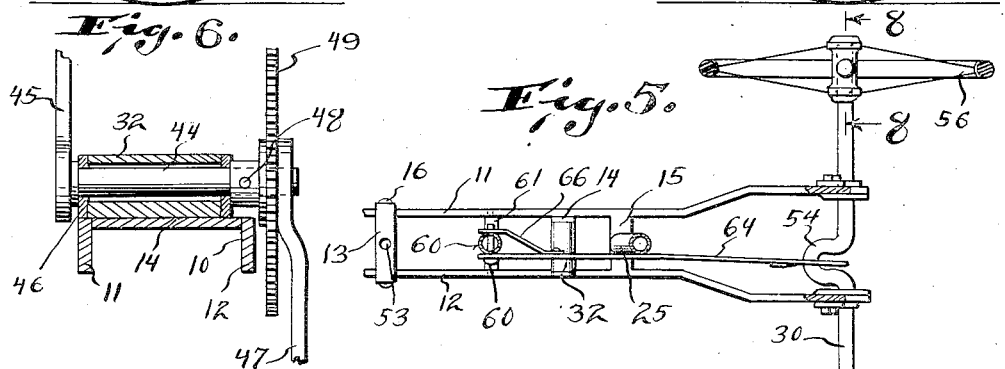
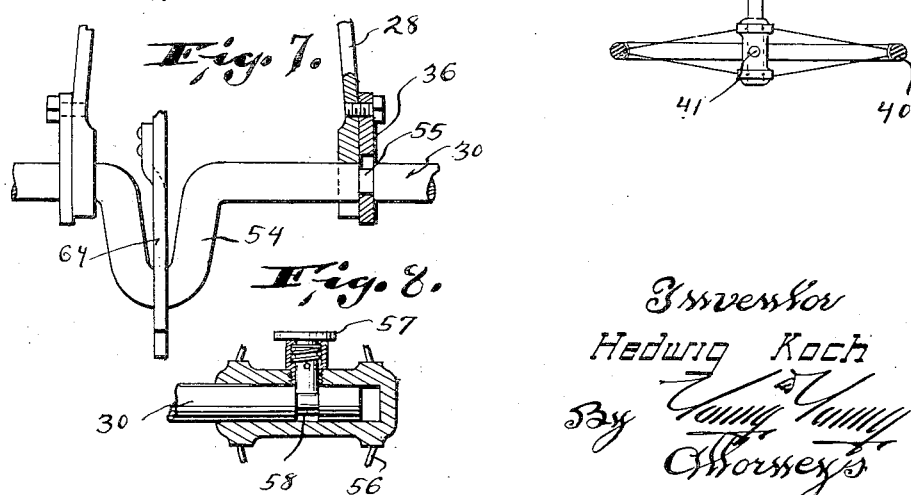
Inventor
Hedwig Koch
By Young Young
Attorneys Patented July 3, 1934

1,965,194

UNITED STATES PATENT OFFICE 1,965,194

COMBINATION VELOCIPEDE

Hedwig Koch, Racine, Wis.

Application May 22, 1933, Serial No. 672,244

2 Claims. (Cl. 208—113)

This invention appertains to toy vehicles and more particularly to a child's vehicle of the type adapted to be propelled by the user.

One of the salient objects of my invention is to provide a child's vehicle, which can be readily changed into a number of different types, whereby the child may have the pleasure of riding a certain kind of vehicle at a desired time, the combination vehicle eliminating the expense of purchasing a number of different kinds of vehicles.

Another important object of my invention is to provide a convertible wheeled toy embodying the characteristics of a small bicycle or velocipede, but which can be readily and easily changed by the child himself into a lever propelled vehicle or into a platform type of vehicle wherein the same is pushed over the ground by the foot of the child.

A further important object of my invention is the provision of a convertible wheeled toy of the velocipede type in which the rear axle can be easily and quickly removed to permit the association of a different type of axle therewith, so that different kinds of drives can be employed, the entire vehicle being so arranged as to permit the child a maximum amount of enjoyment therefrom and at the same time teach the child the rudiments of mechanics and the use of basic tools.

A further important object of my invention is the provision of novel means for forming the frame of the vehicle whereby the different parts of the various types of vehicles can be readily and quickly associated therewith, novel means being provided for forming the pedals and shaft of the velocipede type to permit the same to be easily taken apart or assembled.

A still further object of my invention is to provide a convertible wheeled vehicle of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which:—

Figure 1 is a side elevation of my improved vehicle showing the same put together for use as a two-wheeled bicycle.

Figure 2 is a similar view showing the same put together for use as a "scooter".

Figure 3 is a detail section taken on the line 3—3 of Figure 1 illustrating the rear axle construction for use as a bicycle.

Figure 4 is a side elevation showing the vehicle put together for use as a hand lever operated vehicle, parts of the figure being shown broken away and in section to illustrate structural detail.

Figure 5 is a detail horizontal section taken on the line 5—5 of Figure 4 looking in the direction of the arrows, illustrating the operating mechanism for the rear axle when the hand lever is used.

Figure 6 is a detail section taken on the line 6—6 of Figure 1 illustrating the construction and arrangement of the pedals and pedal shaft for the bicycle type.

Figure 7 is an enlarged detail section taken on the line 7—7 of Figure 4 looking in the direction of the arrows, illustrating the rear axle for receiving the pair of rear wheels, when the hand lever is utilized for operating the same.

Figure 8 is a detail section taken on line 8—8 of Figure 5.

Referring to the drawings in detail, wherein similar reference characters designate the corresponding parts throughout the several views, the letter A generally indicates my improved vehicle, which comprises a frame 10 preferably formed from a pair of spaced parallel frame bars 11 and 12. These frame bars 11 and 12 are rigidly connected together at spaced points by transversely extending straps 13, 14 and 15. The straps 14 and 15 can be welded or otherwise secured in place, while the straps 13 can be connected in place by bolts 16, if so preferred.

The forward ends of the frame bars 11 and 12 in front of the transverse brace strap 13 are bent upwardly as at 17 in converging relation and terminate in spaced parallel uprights 18 to which are firmly bolted bearing collars or sleeves 19. Rotatably mounted within the bearing collars or sleeves 19 is a hollow post 20 having its lower end forked as at 21 for the reception of a front steering wheel 22. The opposite sides of the fork 21 can be provided with laterally extending foot rests, which serve as means for turning the post 20, the fork 21 and the wheel 22 in certain instances, as will be later set forth.

The upper end of the hollow post 20 removably receives a post 23 carrying a handle bar 24. Any preferred means can be provided for adjustably and removably securing the post 23 of the handle bar in position.

Rigidly secured to the rearmost cross brace bar 15 is the hollow tubular seat post 25, which preferably inclines slightly rearwardly. This tubular seat post 25 has adjustably mounted therein the standard 26 of a seat 27. Extending rearwardly from the upper end of the tubular seat post 25 are the diverging standards 28 forming a fork for the reception of the different types of rear axles indicated respectively by the numerals 29 and 30. The lower ends of the fork are formed on or rigidly connected with the rear ends of the longitudinally extending frame bars 11 and 12. By referring to Figures 3 and 7, it will be noted that the lower ends of the standards 28, which form the rear fork, are bifurcated as at 31 to facilitate the easy insertion of the desired axle in place.

Welded on or otherwise rigidly connected with the intermediate transverse brace strap 14 is a bearing sleeve 32, the purpose of which will be later set forth.

When it is desired to form a vehicle of the bicycle or velocipede type, the axle 29 is utilized and this axle has slipped thereon a sprocket wheel 33 the hub of which removably receives a key 34. This key can extend through the axle 29 for rigidly securing the sprocket wheel in place.

Adjacent to the ends thereof, the axle 29 is provided with annular grooves 35 and when the axle is placed within the notches 31, plates 36 are pushed over the axle ends and these plates are then lifted so that the lower walls of the openings 37 formed therein will snugly fit within the annular grooves or ways 35 and the axle is held against the upper walls of the notches 35 by said plates 36. Removable screws 38 are employed for securely fastening the said plates to the standards 29. Obviously, this is a simple method of detachably connecting the axle in position, which will permit the quick removal thereof by a child.

Prior to the placing of the axle 29 in position, a rear wheel 40 is slipped on the axle and the wheel can be firmly and rigidly connected to said axle by the use of a pin 41, which is adapted to extend through the hub of the wheel 40 and through said axle 29. The inner end of the pin 41 is preferably tapered and provided with a threaded extension 42, which extension receives the holding nut 43.

In order to drive the rear axle 29 and wheel 40, a pedal shaft 44 is provided. This pedal shaft 44 can have a pedal crank 45 rigidly connected with one end thereof and the shaft 44 is slipped through the bearing sleeve 33. Bearing washers 46 can be placed on the shaft 44 into engagement with each end of the bearing sleeve 32. A removable pedal crank 47 is placed on the shaft 44 opposite to the crank 45 and is secured in place on the shaft 44 by means of a removable pin 48. This crank 47 has rigidly connected therewith a drive sprocket wheel 49 and a sprocket chain 50 is trained about the sprocket wheels 33 and 49.

By the placing of these few parts in position on the frame, a wheeled vehicle of the bicycle type is formed.

When it is desired to form a vehicle of the foot platform type, which is pushed over the ground by one foot of the user, the pedal shaft 44 and the cranks 45 and 47 are removed. This is easily accomplished by simply removing the pin 48 and pulling the cranks in different directions. If desired, the rear sprocket wheel 33 can be left on the rear axle 29 or this axle can be taken off and the sprocket wheel 33 removed from the axle by knocking out the pin 34.

A platform 51 is then placed on the frame 10 preferably with the rear edge thereof abutting against the bearing sleeve 32. The forward end of the platform is then connected with the front brace strap 13 by the use of a bolt 52, the brace strap 13 being provided with an opening 53 for receiving said bolt. This forms a two wheeled toy vehicle of the type commonly known as a "scooter".

When it is desired to form a toy vehicle of the type embodying a swinging hand operated lever for driving the rear axle, the axle 30 is employed. This axle 30 is of a considerable greater length than the axle 29, so that the ends thereof will extend materially beyond the rear fork of the vehicle. This axle 30 is provided with an intermediate crank 54 and on each side of the crank the same has formed therein an annular groove 55.

In order to form this type of vehicle, the axle 29 is removed from the frame as well as the pedal shaft and the like, and the rear wheel 40 is taken off of the said axle 29. The axle 30 is then associated with the rear fork in the same manner as the short axle 29 and the same plates 36 are utilized for this purpose. The wheel 40 is then secured to one end of the axle 30 by the use of the pin 41 heretofore described. An additional rear wheel 56 is placed on the opposite end of the axle 30 and this wheel has its hub provided with a spring pressed pin 57 the inner end of which is adapted to seat in an annular groove 58 formed in the said axle 30 adjacent to its end.

By this construction the wheel 56 is quickly associated with its axle and is permitted to rotate independently thereof so as to facilitate the travel of the vehicle around corners and the like.

To drive the crank shaft 30, I employ a hand lever 60. The lower end of this hand lever 60 carries a transversely extending bearing sleeve 61 which is received between the longitudinal frame bars 11 and 12 and these frame bars are provided with transversely alined openings 62 for removably receiving a bearing pin 63, and this bearing pin also extends through the bearing sleeve 61. This provides a simple and expeditious means for rockably securing the handle lever 60 in place. The hand lever 60 is preferably formed from a length of tubing and the upper end thereof removably and adjustably receives the handle bar post 23. This allows the convenient manipulation of the handle lever and the front wheel 22 is steered by the feet of the user pressing against the foot rests 23'.

A connecting link 64 is pivotally connected as at 65 to the hand lever 60 intermediate its ends and this connecting rod or link 64 can be provided with an offset bracket 66 for engaging the opposite side of the hand lever 60 from the forward end of said link and the pivot pin 60 extends through the said link and off said bracket 66. By having the offset bracket 66, the link 64 is disposed at one side of the seat post 25, so that the same will not engage the said seat post during the movement thereof by the hand lever.

I provide a novel means for detachably connecting the rear end of the connecting link to the crank 54 of the axle 60 and as shown, the rear end of the link has a bearing notch 67 formed in its lower face. This notch is closed by a removable plate 68 which can be detachably connected to the link by means of bolts or screws 69. Obviously, the link is first placed over the crank 54 after which the plate 68 is secured in position. In order to prevent swinging movement of the plate 68, the rear end of the same is provided with a tongue 70 of a dovetail shape, which tongue fits in a correspondingly shaped notch in the rear end of the link.

While I have illustrated three different types of vehicles which can be formed with the use of a single frame and few additional parts, it is to be understood that I can make other types of vehicles with other types of drives other than shown in the drawings. A rocking platform can be provided through the use of a suitable intermediate mechanism for actuating the rear axle 30.

From the foregoing description, it can be seen that I have provided a novel form of combination vehicle in which a number of different types of wheeled toys can be made, so that a maximum amount of pleasure and enjoyment can be derived therefrom by a child and permit the teaching of a child the rudiments of different mechanical movements.

Changes in details may be made without departing from the spirit or the scope of this invention, but what I claim as new is:—

1. A convertible child's vehicle comprising a frame including a pair of spaced longitudinally extending frame bars, a seat post rigidly secured to the frame bars, a rear fork connecting the upper end of the seat post with the rear ends of the frame bars, a rotatable steering post carried by the front of the frame bars, a ground wheel rotatably carried by the steering post, a removable handle bar connected with the steering post, footrests secured to the steering post, a removable axle connected with the rear ends of the frame bars and the fork, means for rigidly and detachably securing a ground wheel to one end of the axle, means detachably and rotatably securing another ground wheel to the other end of the axle, said axle being provided with an intermediate crank, a hand lever, means detachably and rockably associating the lower end of the hand lever with the frame bars, said hand lever being adapted to detachably receive the handle bar, a connecting link pivotally secured to one side of the hand lever, and means detachably connecting the rear end of the link to the crank.

2. A convertible child's vehicle comprising a frame including a pair of spaced longitudinally extending frame bars, a seat post rigidly secured to the frame bars, a rear fork connecting the upper end of the seat post with the rear ends of the frame bars, a rotatable steering post carried by the front of the frame bars, a ground wheel rotatably carried by the steering post, a removable handle bar connected with the steering post, footrests secured to the post, a removable axle connected with the rear ends of the frame bars and the fork, means for rigidly and detachably securing a ground wheel to one end of the axle, means detachably and rotatably securing another ground wheel to the other end of the axle, said axle being provided with an intermediate crank, a hand lever, means detachably and rockably associating the lower end of the hand lever with the frame bars, said hand lever being adapted to detachably receive the handle bar, a connecting link pivotally secured to one side of the hand lever, and means detachably connecting the rear end of the link to the crank, said means including a notch formed in the lower edge of the link for fitting over said crank, a removable plate bolted to the link closing said notch, the plate and link having a mating notch and tongue on their rear ends.

HEDWIG KOCH.